Patented Apr. 17, 1951

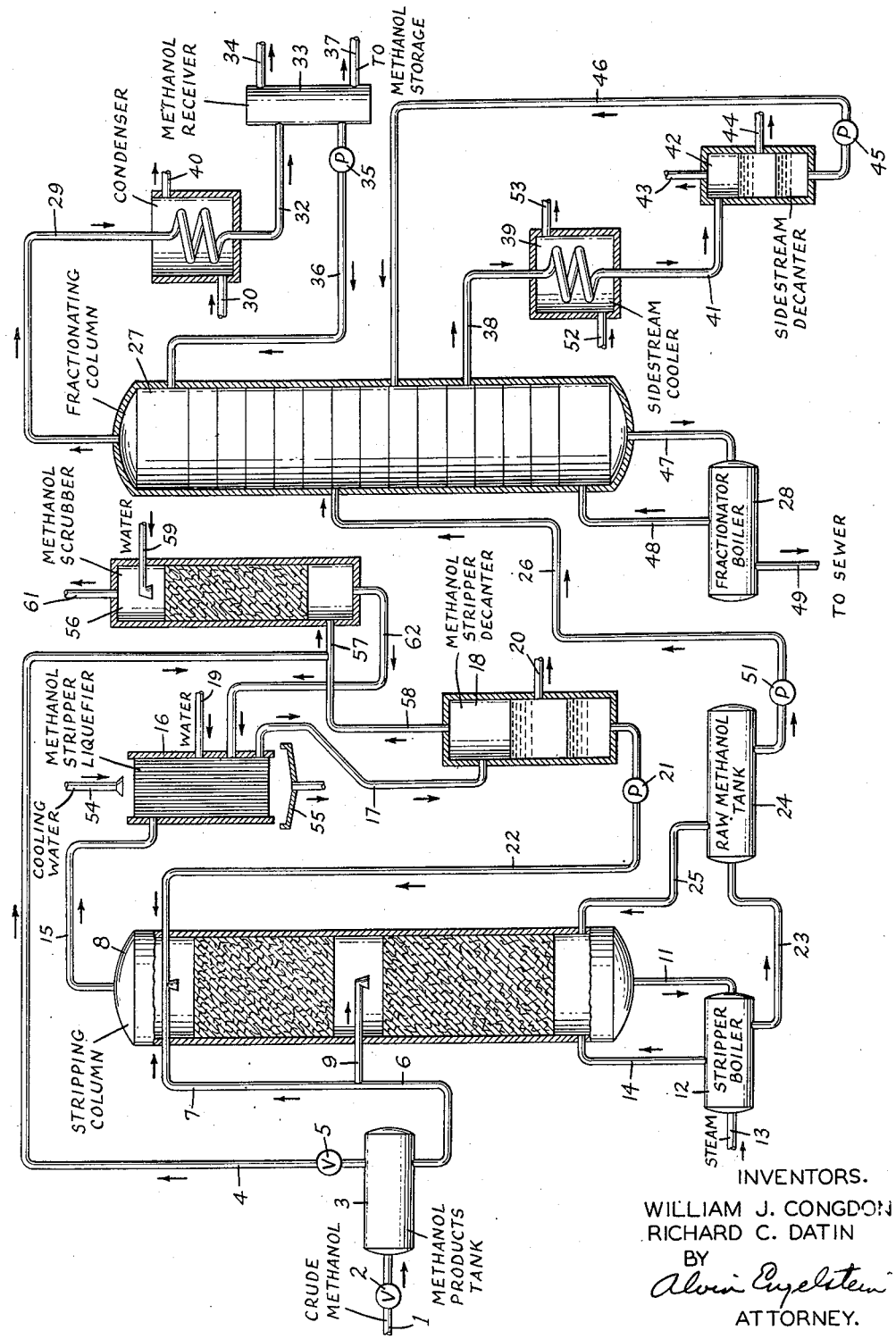

2,549,290

UNITED STATES PATENT OFFICE 2,549,290

PURIFICATION OF CRUDE SYNTHETIC METHANOL

William J. Congdon, Hopewell, and Richard C. Datin, Petersburg, Va., assignors to Allied Chemical and Dye Corporation, New York, N. Y., a corporation of New York Application August 17, 1948, Serial No. 44,646

10 Claims. (Cl. 202—40)

1

This invention relates to the purification of liquids and more particularly refers to a new and improved process for purifying crude synthetic methanol.

In the catalytic synthesis of methanol small amounts of liquid by-products are formed which must be removed in order to obtain a purified product which will pass the various specification tests. These impurities vary from light hydrocarbons to heavy oils, many of which are not eliminated from the product by ordinary fractionation.

Crude methanol obtained from methanol synthesis will usually have the following approximate composition:

| | Parts by weight |
|---|---|
| Methanol | 80 to 81 |
| Dimethyl ether | 10 |
| Water | 4 |
| Dissolved gas | 4 |
| Heavier Impurities | 1 to 2 |

The dissolved gas consists of CO, $CO_2$, $CH_4$, $H_2$, and $N_2$, the amounts of each representing saturation at the conditions of synthesis. Dimethyl ether and water are formed by side reactions occurring in the converter. The heavier impurities consist of (1) an oily material, largely olefinic, boiling above 100° C., and (2) a mixture of oxygenated compounds, chiefly alcohols of molecular weight above that of methanol. The impurities in crude methanol, particularly these two groups of impurities, while present in small amount, must be removed to give methanol as pure as the best commercial grade. The oil concentration in the crude is usually from 0.05 to 0.5% depending on conditions in the converter, while the higher alcohol concentration is of the order of 1 to 2%.

Simple fractionation of crude methanol has been found to produce an unacceptable methanol product on the basis of specifications in use. Various chemical treatments of the crude methanol alone or in combination with conventional fractionation have been found to give either an unsatisfactory product, or require elaborate and expensive treatment or to incur large losses of methanol.

A primary object of the present invention is to provide a simple economical process for removing by-products in crude methanol to such an extent that the final product would be acceptable on the basis of the specification tests in use.

Other objects and advantages will be apparent from the following description and accompanying drawing:

2

In accordance with the present invention purification of crude methanol involving separation of impurities consisting of constituents more volatile than methanol and water-insoluble oily constituents less volatile than methanol dissolved in the crude methanol, may be accomplished by stripping the crude methanol after dilution with returned aqueous methanol with methanol-steam vapors, condensing the vapors, diluting the condensate with water to produce, thereby, an aqueous methanol solution and a separate layer of oily components, releasing uncondensible gases and vapors, withdrawing the oily components, returning the dilute aqueous methanol solution to the stripping zone, and withdrawing aqueous methanol substantially free of the volatile and oily impurities.

Further purification of the crude methanol may be accomplished in accordance with the present invention, by fractionally distilling the stripped aqueous methanol to produce, thereby, an overhead fraction consisting of substantially pure methanol, bottoms substantially free from methanol and an intermediate fraction consisting of oxygenated compounds of molecular weight above that of methanol and an aqueous solution of methanol, separating the oxygenated compounds from the aqueous methanol solution, and, if desired, returning the separated aqueous methanol solution to the fractionation zone.

The accompanying drawing is a diagrammatic flow sheet illustrating one method of practicing the present invention.

Referring to the drawing, crude methanol containing as impurities dimethyl ether, water, dissolved gases and heavier impurities, is introduced through line 1, reducing valve 2 into methanol products tank 3 maintained at a pressure of approximately 30 p. s. i. gauge. Crude methanol, catalytically synthesized at a pressure of about 3000 p. s. i. gauge, when flashed in tank 3 releases through line 4 and valve 5 most of the dissolved gas and dimethyl ether, and a small amount of methanol. Crude methanol from tank 3 is introduced through lines 6 and 7 into the top of stripping column 8 wherein it is diluted with aqueous methanol condensate from methanol stripper decanter 18, or at intermediate point in the stripping column through line 9. Stripping column 8 may be any suitably packed tower for effecting stripping of the gaseous constituents from the crude methanol, preferably a tower divided into two sections of Raschig ring packing, e. g. an upper section of about 7 feet high and a lower section about 24 feet high. Conditions in stripping column 8 are preferably maintained between atmospheric and 15 p. s. i. gauge, with a temperature at the top of the column between 80 and 95° C. Liquid collecting at the bottom of stripping column 8 flows down through line 11 into stripper boiler 12, where it comes in contact with steam introduced through line 13, and the mixture of steam methanol vapors pass upwardly from stripper boiler 12 through line 14 into the bottom of stripping column 8 where they rise countercurrent to the downward flow of crude liquid methanol, thereby effecting stripping of the latter. Although we have illustrated a packed tower in combination with a boiler for effecting contact between steam-methanol vapors and crude methanol, any suitable apparatus for effecting stripping of crude methanol with steam-methanol vapors, may be employed.

Gaseous and vaporous constituents from the top of stripping column 8 pass through line 15 into methanol stripper liquefier 16 to effect condensation of the methanol and the heavier components, and thence, through line 17 into methanol stripper decanter 18, wherein separation of the noncondensible gases and vapors from liquid condensate is effected. Temperature and pressure conditions in stripper 8 are adjusted to produce therefrom a distillate containing, preferably, from 70 to 90% by weight methanol.

Water introduced through line 19 in direct contact with the distillate from the top of tower of stripping column 8 serves the dual function of diluting the resulting condensate to permit separation into an oily layer and an aqueous methanol layer, and cooling the gaseous and vaporous constituents passing through line 15. We have found, that if sufficient water be added to the distillate entering methanol stripper decanter 18, preferably to produce a methanol solution having a concentration of 25 to 40 weight % of methanol, and with a temperature of the condensate collecting in receiver 18 below 40° C., preferably, 20° to 40° C., ready separation of the aqueous methanol solution from the oil is effected. Water from any suitable source may, if desired, be introduced at any point in line 15 or 17, or in decanter 18. Ordinarily, sufficient cooling is not obtained by the water introduced through line 19 in direct contact with the distillate, therefore, additional cooling may be provided by passing cooling water through line 54 in indirect heat exchange with the vaporous products in methanol stripper liquefier 16 and thence out through line 55.

As previously stated, condensate in decanter 18 separates into two layers, an upper oily layer and a lower aqueous methanol layer containing 25 to 40% by weight methanol together with a small amount of dimethyl ether. The lower layer withdrawn from the bottom of decanter 18 is returned by pump 21 through line 22 into the top of stripping column 8 where it flows downwardly countercurrent to the rising steam-methanol vapor mixture. The upper oily layer in decanter 18 is discharged from the system through line 20. Noncondensible gases and vapors are released from decanter 18 through line 58.

Stripper boiler 12 in conjunction with stripping column 8 is operated to produce an aqueous methanol bottom, preferably 30–70% by weight methanol concentration, substantially free from gaseous components, dimethyl ether and oily materials. Bottoms withdrawn from stripper boiler 12 through line 23 may be directed into raw methanol tank 24 where any gases or vapors evolved therein are released from the top of tank 24 and returned through line 25 into stripping column 8.

Raw methanol in tank 24, containing approximately 30 to 70% by weight methyl alcohol together with higher boiling oxygenated compounds as impurities, is forced by pump 51 through line 26 into about the center of fractionating column 27, which may be of any conventional design, preferably the bubble cap type.

Additional heat for effecting fractionation in column 27 may be furnished by the use of closed steam coils in fractionator boiler 28 or a preheater interposed in line 26.

Other conventional means, such as a fractionating column and a reboiler section embodied in the fractionating column, may be employed in lieu of the combination of column 27 and fractionator boiler 28 illustrated in the drawing. Temperature and pressure conditions in the fractionating column are maintained to produce as an overhead condensate from column 27, a methanol product which contains less than 0.5% by weight of impurities.

The vaporous constituents leaving the top of column 27 pass through line 29, condenser 31 wherein methanol vapors are liquefied by means of water entering line 30 and discharging through line 40, and thence, through line 32 into receiver 33. Any gaseous and uncondensed vaporous components may be released from the top of receiver 33 through line 34. Part of the methanol condensate collecting in receiver 33 is returned to the top of column 27 by means of pump 35 and line 36 for the purpose of maintaining temperature control, thereby regulating the quality of the methanol. Purified methanol accumulating in receiver 33 is directed to storage through line 37. At a short distance from the bottom of the boiler, about 2 to 8 plates from the bottom, a side stream containing a high proportion of higher boiling oxygenated compounds usually consisting of higher alcohols of molecular weight above methanol, is removed through line 38, cooled to a temperature of about 0° to 40° C. in side stream cooler 39 by indirect heat exchange with water entering line 52 and discharging through line 53, and thence, passed through line 41 into side stream decanter 42.

One convenient method determining the approximate point at which the side stream in column 27 should be withdrawn, is to withdraw the side stream at a point in the column where the temperature is approximately 10° C. below that at the bottom of the column. The temperature at the bottom of the column is usually about the boiling point of water at the pressure existing at that point. At the top of sidestream decanter 42 is vent 43. Liquid condensate accumulating in decanter 42 separates into two layers, an upper layer rich in higher boiling oxygenated compounds which is withdrawn from the system through line 44, and a lower layer consisting primarily of a dilute aqueous solution of methanol containing small amounts of higher boiling oxygenated compounds which is returned by pump 45 and line 46 to column 27. Approximately 90% of the higher boiling oxygenated compounds separate in the upper layer with 10% in the lower layer. Liquid collecting in the bottom of fractionating column 27 flows by gravity through line 47 into fractionator boiler 28, wherein upon the application of heat vaporous components are evolved and returned through line 48 to fractionating column 27. The bottoms of fractionator boiler 28, essentially water containing a minor amount of methanol, are discharged through line 49 to the sewer.

Gaseous and vaporous constituents consisting primarily of CO, $CO_2$, $CH_4$, $H_2$, $N_2$, and dimethyl ether together with small amounts of methanol are released from the top of methanol products tanks 3 through valve 5 and line 4 and introduced into the bottom of methanol scrubber 56 through line 57. Noncondensible gases and vapors from the top of methanol stripper decanter 18 are also introduced through lines 58 and 57 into the bottom of methanol scrubber 56, which may be any suitable tower, preferably a packed tower for the purpose of effecting scrubbing of methanol from the incoming gases by countercurrent contact with water introduced through line 59 into the top of methanol scrubber 56.

Gases stripped of their methanol content are released from the top of scrubber 56 through line 61 and may be utilized for fuel purposes. The dilute aqueous methanol solution accumulating in the bottom of scrubber 56 may be fed to the system for recovery of the methanol, preferably through line 62 into methanol stripper liquefier 16.

In localities where water is not a plentiful commodity, the water introduced into scrubber 56 may be steam condensate or water withdrawn from fractionator boiler 28 through line 49. Water from these sources may also be introduced through line 19 into methanol stripper liquefier 16.

Suitable pumps, valves, pressure and temperature controls, liquid level gauges, etc. may be provided for carrying out our operation as will be apparent to those skilled in the art.

The following example illustrates the present invention.

Crude synthetic methanol having the following composition is introduced into the top of a stripping column packed with Raschig rings.

*Crude synthetic methanol*

| | Parts by weight |
|---|---|
| Methanol | 94.7 |
| Water | 2.6 |
| Dimethyl ether | 0.5 |
| Dissolved gas | 0.4 |
| Oily material (unsaturated and saturated hydrocarbons) | 0.5 |
| Oxygenated compounds | 1.3 |

Steam introduced into a boiler connected with the bottom of the stripping column passes upwardly together with methanol vapors in countercurrent contact with the downflowing crude mehanol thereby stripping the latter of its dissolved gas, dimethyl ether and oily material. Pressure on the stripping tower is maintained at 10 p. s. i. gauge with a top temperature of 80° C. Vapors leaving the stripping column are cooled and water added to produce a condensate containing 30% by weight methanol at a temperature of 25° C. and the mixture passed into a decanter from which noncondensible gases and uncondensed vapors are released and in which the condensate separates into an upper oily layer and a lower layer of dilute aqueous methanol solution. The oily layer is withdrawn from the system and the lower layer returned to the top of the stripping column for further contact with methanol steam-vapors.

Bottoms from the boiler containing about 60% by weight methanol are passed into a bubble cap type fractionating column containing 30 plates which is maintained at a pressure of 5 p. s. i. gauge with a top temperature of 72° C. and a bottom temperature of about 115° C. Heat is supplied to the methanol solution undergoing fractionation by means of a boiler section connected to the bottom of the tower. Vapors from the top of the fractionating column are condensed, collected in a receiver and discharged to storage. About two-thirds of the condensed methanol is returned in regulated amounts to the top of the fractionating tower to maintain the temperaure here at 72° C. A sidecut consisting of a mixture of oxygenated compounds of molecular weight greater than methanol, methanol and water is withdrawn from the tower at a point where the temperature is about 105° C., cooled to 35° C. and separated into an upper layer rich in oxygenated compounds which is discharged from the system, and a lower layer consisting primarily of an aqueous methanol solution which is returned to the fractionating column. Bottoms withdrawn from the bottom of the fractionating tower is essentially water.

Alhough certain preferred embodiments of the invention have been disclosed for purposes of illustration, it will be evident that various changes and modifications may be made therein without departing from the scope and spirit of the invention.

We claim:

1. A process for purifying crude methanol obtained from methanol catalytic synthesis containing small amounts of liquid unsaturated and saturated hydrocarbons as by-product oily impurities which comprises diluting the crude methanol with water to form a methanol-water mixture, introducing the mixture into a stripping zone wherein vapors of methanol, water and oily material are evolved, cooling and condensing said vapors, diluting the condensate with water to effect its separation into an oily layer and an aqueous methanol layer, separating the oily layer, returning the aqueous methanol layer to the stripping zone, and withdrawing from the stripping zone an aqueous methanol solution substantially free from oily material.

2. A process for purifying crude methanol obtained from methanol catalytic synthesis containing small amounts of liquid unsaturated and saturated hydrocarbons as by-product oily impurities which comprises introducing the crude methanol and a dilute aqueous methanol condensate into a stripping zone wherein vapors of methanol, water and oily material are evolved, cooling and condensing said vapors, diluting the condensate with water to effect its separation into an oily layer and an aqueous methanol layer, separating the oily layer, returning the aqueous methanol layer to the stripping zone, and withdrawing from the stripping zone and aqueous methanol solution substantially free from oily material.

3. A process for purifying crude methanol obtained from methanol catalytic synthesis containing as impurities constituents more volatile than methanol and a small amount of liquid unsaturated and saturated hydrocarbons as by-product oily material which comprises introducing the crude methanol and an aqueous methanol condensate into a stripping zone wherein vapors of the more volatile constituents, methanol and oily materials are evolved, cooling said vapors, condensing the methanol and the higher boiling vapors, diluting the condensate with water to effect its separation into an oily layer and an aqueous methanol layer, separating the uncondensed vaporous constituents from the condensate, separating the oily layer, returning the aqueous methanol layer to the stripping zone, and withdrawing from the stripping zone an aqueous methanol solution substantially free from oily material and constituents more volatile than methanol.

4. A process for purifying crude methanol obtained from methanol catalytic synthesis containing as impurities constituents more volatile than methanol and a small amount of liquid unsaturated and saturated hydrocarbons as by-product oily material which comprises forming a crude methanol-water mixture and stripping the mixture with methanol-steam vapors in a stripping zone, cooling and condensing the evolved vapors from the stripping zone, diluting the condensate with water to effect its separation into an oily layer and an aqueous methanol layer, separating the oily layer, returning the aqueous methanol layer to the stripping zone, and withdrawing from the stripping zone an aqueous methanol solution substantially free from oily material and constituents more volatile than methanol.

5. A process for purifying crude methanol obtained from methanol catalytic synthesis containing as impurities dissolved gas such as CO, $CO_2$, $CH_4$, $H_2$, and $N_2$, dimethyl ether and a small amount of liquid unsaturated and saturated hydrocarbons as by-product oily material which comprises passing the crude methanol together with a dilute aqueous methanol condensate in countercurrent contact with methanol-steam vapors, cooling the evolved vapors condensing the methanol and higher boiling vapors, diluting the condensate with water to effect its separation into an oily layer and an aqueous methanol layer, separating the uncondensed gases and uncondensed vapors of dimethyl ether, separating the oily layer, returning the aqueous methanol layer for further contact with the methanol-steam vapors, and withdrawing unvaporized liquid resulting from contact between crude methanol and methanol-steam vapors.

6. A process for purifying crude methanol obtained from methanol catalytic synthesis containing a small amount of liquid unsaturated and saturated hydrocarbons as by-product oily material which comprises subjecting the crude methanol together with a dilute aqueous methanol condensate to a stripping action to remove as vapors the oily material and a methanol distillate containing 70 to 90% by weight methanol, cooling said vapors to a temperature below 40° C. thereby condensing the methanol and higher boiling vapors, diluting the condensate with sufficient water to produce an aqueous methanol solution containing 25 to 40% by weight methanol, separating the condensate into an oily layer and an aqueous methanol layer, returning the diluted aqueous methanol solution for further stripping, and withdrawing an aqueous methanol solution containing 30 to 70% by weight methanol from said stripping action.

7. A process for purifying crude methanol obtained from methanol catalytic synthesis containing as impurities constituents more volatile than methanol, a small amount of liquid unsaturated and saturated hydrocarbons as by-product oily material, and by-product and oxygenated compounds comprising alcohols having a molecular weight greater than methanol, which comprises introducing the crude methanol and a dilute aqueous methanol condensate into a stripping zone wherein vapors of the more volatile constituents, methanol and oily material are evolved, cooling said vapors, condensing the methanol and the higher boiling vapors, diluting the condensate with water to effect its separation into an oily layer and an aqueous methanol layer, separating the uncondensed vaporous constituents from the condensate, returning the aqueous methanol layer to the stripping zone, withdrawing from the stripping zone an aqueous methanol solution substantially free from constituents more volatile than methanol and oily material, and subjecting said aqueous methanol solution from the stripping zone to fractional distillation to produce thereby a low boiling fraction consisting essentially of pure methanol, an intermediate fraction containing oxygenated compounds of molecular weight higher than methanol and bottoms consisting essentially of water.

8. A process for purifying crude methanol obtained from methanol catalytic synthesis containing as impurities constituents more volatile than methanol, a small amount of liquid unsaturated and saturated hydrocarbons as by-product oily material, and by-product and oxygenated compounds comprising alcohols having a molecular weight greater than methanol, which comprises subjecting the crude methanol together with added water to direct contact with methanol-steam vapors to remove as vapors constituents more volatile than methanol and oily material, passing the resulting methanol solution substantially freed from constituents more volatile than methanol and oily material into a fractionating zone, removing from said fractionating zone vapors consisting of methanol containing less than 0.5% by weight as impurities, condensing and collecting the said purified methanol vapors, withdrawing a side cut from said fractionating zone consisting of a higher boiling fraction containing heavier oxygenated compounds having a molecular weight greater than methanol, cooling said side cut to a temperature below 40° C., separating said side cut into an aqueous layer containing a small amount of heavier oxygenated compounds and a layer rich in heavier oxygenated compounds, returning the aqueous layer to the fractionating zone, and withdrawing bottoms consisting essentially of water from the fractionating zone.

9. A process for purifying crude methanol obtained from methanol catalytic synthesis containing as impurities constituents more volatile than methanol including dissolved gases, a small amount of liquid unsaturated and saturated hydrocarbons as by-product oily material, and by-product oxygenated compounds comprising alcohols having a molecular weight greater than methanol which comprises passing said crude methanol at high superatmospheric pressure from a synthesis converter into a low pressure vessel maintained at slight superatmospheric pressure to effect release therefrom of a major portion of dissolved gases and constituents more volatile than methanol, subjecting the resulting crude methanol together with a dilute aqueous methanol condensate to direct contact with methanol-steam vapors in a stripping zone to vaporize dissolved gases, constituents more volatile than methanol, oily material, methanol and water, cooling the gaseous and vaporous components from the stripping zone, condensing the methanol and higher boiling vapors, diluting the condensate with water to effect its separation into an oily layer and an aqueous methanol layer, releasing the non-condensible gases and uncondensed vaporous constituents from the condensate, separating the oily layer, returning the aqueous methanol layer to the stripping zone, withdrawing from the stripping zone an aqueous methanol solution substantially free from oily material and constituents more volatile than methanol, subjecting said aqueous methanol solution from the stripping zone to fractional distillation to produce thereby a low boiling fraction consisting essentially of pure methanol, an intermediate fraction containing oxygenated compounds of molecular weight higher than methanol and bottoms consisting essentially of water, introducing gases from said low pressure vessel together with gases released from the stripping zone into an absorption zone, scrubbing said gaess with water to absorb methanol from said gases, and commingling said enriched water with vapors leaving the stripping zone for return to the stripping zone.

10. A process for purifying crude methanol obtained from methanol catalytic synthesis containing as impurities dissolved gas, such as CO, $CO_2$, $CH_4$, $H_2$ and $N_2$, dimethyl ether, a small amount of liquid unsaturated and saturated hydrocarbons as by-product oily material and by-product oxygenated compounds comprising alcohols having a greater molecular weight than methanol, which comprises passing the crude methanol together with a dilute aqueous methanol condensate in countercurrent contact with methanol-steam vapors, cooling the evolved vapors, condensing the methanol and higher boiling vapors, diluting the condensate with water to effect its separation into an oily layer and an aqueous methanol layer, separating the uncondensed gases and dimethyl ether vapors, separating the oily layer, returning the aqueous methanol layer for further contact with the methanol-steam vapors, withdrawing unvaporized liquid resulting from the countercurrent contact between crude methanol and methanol-steam vapors, subjecting said unvaporized liquid to fractional distillation to produce thereby a low boiling fraction consisting essentially of pure methanol, an intermediate fraction containing oxygenated compounds of molecular weight higher than methanol, and bottoms consisting essentially of water.

WILLIAM J. CONGDON.
RICHARD C. DATIN.

REFERENCES CITED

The following references are of record in the file of this patent:

UNITED STATES PATENTS

| Number | Name | Date |
|---|---|---|
| 887,793 | Guillaume | May 19, 1908 |
| 1,847,597 | Charles | Mar. 1, 1932 |
| 2,148,846 | Von Retze et al. | Feb. 28, 1939 |
| 2,290,442 | Metzl | July 21, 1942 |

FOREIGN PATENTS

| Number | Country | Date |
|---|---|---|
| 409,053 | Great Britain | Apr. 26, 1934 |